March 29, 1966  C. M. GOBHAI  3,243,115
FLUID LOGIC HALF SUBTRACTOR
Filed June 24, 1964
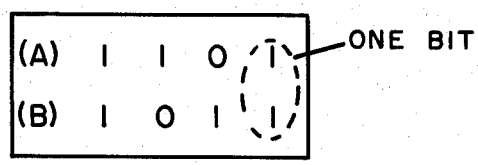
FIGURE I
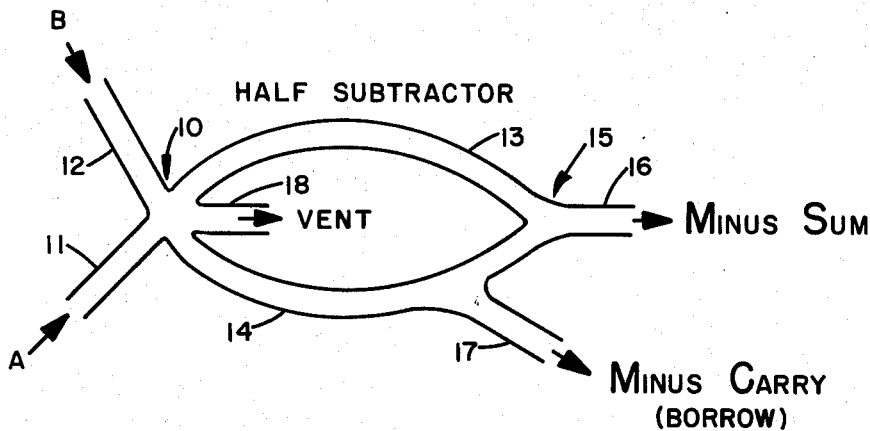
FIGURE II
| TRUTH TABLE (FIG. II) | | | |
|---|---|---|---|
| HALF SUBTRACTOR | | | |
| A | B | -SUM | -CARRY |
| 0 | 0 | 0 | 0 |
| 0 | 1 | 1 | 1 |
| 1 | 0 | 1 | 0 |
| 1 | 1 | 0 | 0 |
FIGURE III
INVENTOR.
CAVAS M. GOBHAI
BY
Lawrence H. Poulton
AGENT United States Patent Office 3,243,115
Patented Mar. 29, 1966

3,243,115
FLUID LOGIC HALF SUBTRACTOR
Cavas M. Gobhai, Cambridge, Mass., assignor to The Foxboro Company, Foxboro, Mass., a corporation of Massachusetts
Filed June 24, 1964, Ser. No. 377,659
1 Claim. (Cl. 235—201)

This invention relates to fluid logic devices and in particular provides a binary arithmetic half subtractor.

This invention has the advantage of a simple fluid system in a logic device with no moving parts available on a compact and reliable basis. A special form of logic device is thus herewith presented for the purpose of achieving the binary arithmetic function of subtraction. This is called a half subtractor since the unit is complete unto itself and the Minus Carry function (borrow) is an arithmetic indicator rather than a working output in the confines of the simple device as shown.

Other objects and advantages of this invention will be in part apparent and in part pointed out hereinafter and in the accompanying drawings, wherein:

FIGURE I is a showing of a pair of binary numbers in explanation of the area of operation of this device;

FIGURE II is a schematic illustration of a fluid system in a half subtractor according to this invention; and FIGURE III is a truth table in explanation of the operation of the system of FIGURE II.

This is a dynamic fluid device on a continuous flow basis.

The FIGURE I showing of a pair of binary numbers is indication that the number B is to be subtracted from the number A for the purposes of explanation of this invention. The numbers A and B are made up of pairs of digits, each pair being called a bit. The single bit at the right hand side in FIGURE I is included in a dotted line form to indicate that this single bit is the two digit situation which is subtracted through the use of the system of FIGURE II.

The other bits in the FIGURE I situation, that is 0 over 1, 1 over 0 and the final at the left, 1 over 1, are separate bits and separate operations each requiring a device such as that of FIGURE II, with suitable coupling means between the systems of FIGURE II, for each of the bits. This invention is embodied in the system of FIGURE II and operates on a single bit, two digits, as enclosed by a dotted line in FIGURE I. Note that for explanatory purposes the situation is A minus B.

The FIGURE II fluid system is provided with a crossroads area as at 10, with an input passage 11 for the signals A, and an input passage 12 for the signals B. The crossroads area and the relative passage locations are such that a signal A into the passage 11, without interference, will continue across the crossroads area 10 and into an output passage 13. Similarly a signal into the passage B without interference will traverse the crossroads area 10 and enter and pass through an output passage 14. The output passages 13 and 14 are joined downstream at a juncture 15 leading to a common output passage 16. The output passage 14 is provided with a branch 17 which departs from the output passage 14 between crossroads area 10 and the output juncture 15 of the output passages 13 and 14. Finally from the crossroads area 10 and output vent 18 is provided intermediate the output passages 13 and 14.

It will be seen that a signal A in the passage 11 when there is no signal B in the passage 12, will go straight across and enter the passage 13 and appear in the output passage 16. Similarly when there is a signal B in the passage 12, and no signal A in the passage 11, signal B will cross into the output passage 14, and will exit through both the branch 17 and the common output 16.

In the joint situation where there is a signal A and a signal simultaneously, they meet in the crossroads area 10 and, impinging against each other, will change direction. Together they will exit through the vent 18 without putting any effective signal in either of the outputs 13 or 14.

In considering the truth table of the FIGURE III with respect to the system FIGURE II, note that the arbitrarily selected situation is A minus B. A or B may be either 0 or 1 and nothing else, according to the binary nature of the operation. Thus when both A and B are 0 there is no flow through the system. The Minus Sum in passage 16 is 0, the Minus Carry in passage 17 and the signal from the vent 18 are also each 0, since there is no flow through the device at all.

When A is 0 and B is 1 there is no signal in the passage 13 and there is no signal in the vent 18 because there is no interference. Therefore, there is a signal only in the input 12, the output 14, the branch output 17, and the common output 16. Thus 1 from 0 provides a Minus Sum of 1 with a Minus Carry (borrow) of 1 as is correct in the binary situation of 1 from 0.

In the third situation of A equals 1 and B equals 0, there is a signal in the input passage 11, the output passage 13, and the common output passage 16. There is no signal in the output passage 14, the branch 17, or the vent 18. Thus 0 from 1 results in a Minus Sum of 1 in the output passage 16, a 0 in the Minus Carry Passage 17, and in the vent passage 18.

The final situation is A equals 1 and B equals 1. In the actual happening in the device, signal flows A and B meet in the crossroads area 10 and change each others direction. Both exit through vent 18. Thus there is no signal in the output passage 13 or 14 and none in either the common outputs 16 or the branch 17. There is only the venting through the passage 18 which is not utilized in this situation except to get rid of the signals. Thus in this situation the common sum is 0 and the Minus Carry signal is 0.

This invention therefore provides a new and useful binary arithmetic device in the nature of a half subtractor which provides one output in terms of Minus Sum and another output in terms of Minus Carry.

As many embodiments may be made of the above invention, and as changes may be made in the embodiments set forth above without departing from the scope of the invention, it is to be understood that all matter hereinbefore set forth or shown in the accompanying drawing is to be interpreted as illustrative only and not in a limiting sense.

I claim:

A fluid logic, binary arithmetic half-subtractor, passive crossroads passage system, comprising, in combination, an input passage for one fluid signal (A), an input passage for another fluid signal (B), a crossroads operating area into which said input passages lead at an angle of opposition to each other, an output passage from said operating area, aligned to receive signals from input passage (A) across said operating area when there is no signal in input passage (B), another output passage from said operating area, aligned to receive signals from input passage (B) across said operating area when there is no signal in input passage (A), a vent passage from said operating area, located between said output passages to receive a single resultant signal from both input passage (A) and input passage (B) when there is a signal in both said input passages and these signals meet and are mutually deflected in said operating area to produce said resultant signal as a vent take-off comparable to a plus carry, and in consequence result in zero output in each of said output passages, a downstream juncture of said output passages as a minus sum take-off provided as a single output signal from said juncture whenever a signal is present in one of said input passages (A, B) and a signal is absent in the other of said input passages, and a branch output passage from one of said output passages, downstream of said crossroads and upstream of said juncture, to operatively provide a minus carry (borrow) take-off whenever a signal is present in the related one of said input passages and a signal is absent in the other of said input passages, said minus carry being operatively zero when a signal is present in both of said input passages, and when a signal is present only in the unrelated input passage not leading to the output passage from which said branch passage leads, whereby said half-subtractor system and operation is according to the truth table:

| A | B | −Sum | −Carry |
|---|---|------|--------|
| 0 | 0 | 0 | 0 |
| 0 | 1 | 1 | 1 |
| 1 | 0 | 1 | 0 |
| 1 | 1 | 0 | 0 |

References Cited by the Examiner

UNITED STATES PATENTS 3,128,040  4/1964  Norwood _____ 235—201

OTHER REFERENCES

Hobbs, Fluid Amplification-Logic Elements, Harry Diamond Laboratories, U.S. Army Materiel Command, March 8, 1963, pages 8 and 20.

Mitchell, et al., Fuid Logic Devices and Circuits, Transactions of the Society of Instrument Technology, February 26, 1963, pages 4–7.

Truslove, Fluid Counter, IBM Technical Disclosure Bulletin, vol. 6, No. 3, August 1963, page 24.

Wood et al., Fluid Computers, International Science and Technology, No. 23, pages 44–52, October 28, 1963.

LOUIS J. CAPOZI, *Primary Examiner.*

LEO SMILOW, W. F. BAUER, *Assistant Examiners.*